United States Patent
Anno et al.

(10) Patent No.: US 9,274,631 B2
(45) Date of Patent: Mar. 1, 2016

(54) DISPLAY DEVICE

(71) Applicants: Japan Display Inc., Tokyo (JP); Panasonic Liquid Crystal Display Co. Ltd., Hyogo-ken (JP)

(72) Inventors: Kouichi Anno, Mobara (JP); Takumi Sato, Mobara (JP); Masahiro Teramoto, Mobara (JP)

(73) Assignees: Japan Display Inc., Tokyo (JP); Panasonic Liquid Crystal Display Co. Ltd., Hyogo-ken (JP)

( * ) Notice: Subject to any disclaimer, the term of this patent is extended or adjusted under 35 U.S.C. 154(b) by 0 days.

(21) Appl. No.: 14/254,926

(22) Filed: Apr. 17, 2014

(65) Prior Publication Data

US 2014/0225849 A1    Aug. 14, 2014

Related U.S. Application Data

(63) Continuation of application No. 13/151,362, filed on Jun. 2, 2011, now Pat. No. 8,704,762.

(30) Foreign Application Priority Data

Jun. 2, 2010  (JP) ................................ 2010-126877

(51) Int. Cl.
G06F 3/041          (2006.01)
(52) U.S. Cl.
CPC ..................................... G06F 3/041 (2013.01)
(58) Field of Classification Search
None
See application file for complete search history.

(56) References Cited

U.S. PATENT DOCUMENTS

| | | | |
|---|---|---|---|
| 6,262,579 B1 | 7/2001 | Chazan et al. | |
| 7,034,442 B2 | 4/2006 | Hirayama et al. | |
| 7,167,154 B2 | 1/2007 | Sato et al. | |
| 8,482,301 B2 * | 7/2013 | Kurashima | G06F 3/044 324/658 |
| 2006/0038580 A1 * | 2/2006 | Hasegawa et al. | 324/770 |
| 2008/0144023 A1 | 6/2008 | Shibata et al. | |

(Continued)

FOREIGN PATENT DOCUMENTS

| | | |
|---|---|---|
| CN | 1725064 | 1/2006 |
| CN | 101620490 | 1/2010 |

(Continued)

OTHER PUBLICATIONS

Translation of Office Action in connection with corresponding Chinese Application No. 2011101531803, dated Aug. 1, 2013.

(Continued)

*Primary Examiner* — Kenneth B Lee, Jr.
(74) *Attorney, Agent, or Firm* — Typha IP LLC (57) ABSTRACT

A display device includes a display panel, a light shielding plate having an opening, a protective plate, and a coordinate input device having a transparent substrate, and a first flexible interconnect substrate. The coordinate input device is disposed on the display panel at the side of a display screen, and each of the light shielding plate and the protective plate is arranged on the coordinate input device on the opposite side of the display panel. The coordinate input device has first signal interconnects and a second signal interconnect disposed outside the first signal interconnects but near a peripheral edge of the transparent substrate. The second signal interconnect is formed of a thin conductive film disposed along a peripheral edge portion of the transparent substrate, and is disposed along the peripheral edge of three sides of the transparent substrate.

17 Claims, 8 Drawing Sheets

(56) References Cited

U.S. PATENT DOCUMENTS

| | | |
|---|---|---|
| 2008/0246741 A1 | 10/2008 | Hinata |
| 2009/0322704 A1* | 12/2009 | Anno .......................... 345/174 |
| 2010/0085320 A1 | 4/2010 | Kuwajima et al. |
| 2010/0134137 A1 | 6/2010 | Kida |

FOREIGN PATENT DOCUMENTS

| | | |
|---|---|---|
| JP | 07-056192 | 3/1995 |
| JP | 07-152043 | 6/1995 |
| JP | 09-080478 | 3/1997 |
| JP | 2002-350896 | 12/2002 |
| JP | 2006038988 A | 2/2006 |
| JP | 2008-276729 A | 11/2008 |
| JP | 2009-53390 | 3/2009 |
| KR | 10-2008-0055248 | 6/2008 |
| WO | 2008-136153 A1 | 11/2008 |
| WO | WO 2008/136153 | 11/2008 |

OTHER PUBLICATIONS

Office Action dated Jun. 23, 2015 regarding a corresponding Japanese Patent Application No. 2014-066102.
Office Action issued dated Oct. 6, 2015 regarding a corresponding Japanese Patent Application No. 2014-066102.

* cited by examiner

DISPLAY DEVICE

CROSS REFERENCE TO RELATED APPLICATION

This application is a continuation of U.S. application Ser. No. 13/151,362, filed Jun. 2, 2011, the contents of which are incorporated herein by reference.

CLAIM OF PRIORITY

The present application claims priority from Japanese Patent Application JP 2010-126877 filed on Jun. 2, 2010, the content of which is hereby incorporated by reference into this application.

BACKGROUND OF THE INVENTION

1. Field of the Invention

The present invention relates to a display device. The invention particularly relates to a technique of facilitating the inspection for signal interconnects formed in the region outside detection and display areas for the display device.

2. Description of the Prior Art

A liquid crystal display panel is configured such that a first substrate is opposed to second substrate by way of a liquid crystal layer, in which the first substrate (TFT substrate) is formed with thin film transistors, pixel electrodes, etc. and the second substrate (color filter substrate) is formed with color filters, etc. The liquid crystal display panel having such a structure is manufactured as follows. The first substrate (TFT substrate), which contains circuit patterns for the liquid crystal display devices by a plurality number of sheets, is bonded to the second substrate (color filter substrate) including color filters, etc., where liquid crystals are sealed between the substrates. The thus-formed glass substrate is then cut on every liquid crystal display device. If chipping or crack is formed at the end of the glass substrate at the cutting step or during handling of the glass substrate, a problem with interconnect defect arises in which signal interconnects formed over the substrate are disconnected at the same time with occurrence of substrate chipping or cracking.

In a display device mounted on a mobile information terminal, a coordinate input device referred to as a touch panel is attached to the liquid crystal display panel on the side of the display surface and so image display is generally controlled based on the information provided by the display image and the contact position. The touch panel has such a structure that electrodes are formed in a detection region over a glass substrate and signal interconnects for supplying driving signals to the electrodes are formed at the periphery of the detection region. Accordingly, a problem with interconnect defect arises in which the signal interconnects are disconnected at the same time with occurrence of substrate chipping or cracking as is the case with the liquid crystal display panel.

JP-A-2002-350896, for example, discloses a liquid crystal display device as a method of detecting such interconnect defect. The liquid crystal display device described in JP-A-2002-350896 is configured as follows. Common interconnects arranged in parallel are connected to each other at the peripheral edge portion of the display screen and the display screen is formed with an opening at a central portion thereof, thereby enabling detection of disconnection of the common interconnects using an array technique.

Further, JP-A-1997-80478 discloses a technique of detecting short-circuit of drain lines by using a provisional interconnect formed in parallel with gate lines. Further, JP-A-1995-152043 discloses a technique of forming a liquid crystal display device pattern by a plurality number of sheets per one glass substrate. In such a technique, when the glass substrate is divided into liquid crystal display devices at a cutting step, common interconnects for connecting interconnects to each other are provided for regions where the liquid crystal display devices are separated.

SUMMARY OF THE INVENTION

Since the touch panel is attached to the liquid crystal display panel on the side of the display surface and adapted to detect an operator's input instruction, a light shielding film is disposed at the periphery of a detection region so as to cover the region in which the interconnect region, etc. are formed. If the touch panel is attached to the liquid crystal display panel on the side of the display, therefore, the interconnect region is located between the light shielding film and the liquid crystal display panel. This makes it extremely difficult to perform visual inspection for disconnection of signal interconnects attributable to substrate chipping or cracking. Therefore, it is difficult to discover, until the final inspection that requires much time for inspection, disconnection of signal interconnects which possibly occur after bonding of the liquid crystal display panel to the touch panel. What is needed is a simple inspection method.

On the other hand, since the method described in JP-A-2002-350896 requires inspection on every signal interconnect, it may take extremely much time as is the case with the final inspection. In contrast, none of JPA-1997-80478 and JP-A-1995-152043 includes a description about the inspection of signal interconnects.

The present invention has been made in view of the problems described above, and the object of the invention is to provide a technique that can simply determine pass/failure of signal interconnects for chipping or cracking of a substrate without increase in the number of manufacturing steps.

(1) To solve the problems described above, the present invention provides a display device comprising:
  a coordinate input device including
    a transparent substrate having detection electrodes disposed in a detection region corresponding to a contact position, the transparent substrate having a first signal interconnect disposed in a region outside the detection region, the first signal interconnect having one end connected to the detection electrodes and being formed with a first electrode terminal at the other end thereof, and
    a flexible interconnect substrate connected to the first electrode terminal, the flexible interconnect substrate used for supplying a driving signal to the detection electrodes by way of the first signal interconnect and extracting a detection signal from the detection electrodes; and
  a display panel for image display based on a video signal from an external system, the coordinate input device being disposed on the display panel at the side of a display screen;
  wherein the coordinate inputting device has a second signal interconnect disposed outside the first signal interconnect but near the peripheral edge of the transparent substrate, the second signal interconnect surrounding the area where the detection region is included and the first signal interconnect is formed, the second signal interconnect being opened at opposite ends thereof and being connected to respective electrode terminals for inspection at the open ends, and
  wherein the second signal interconnect is formed of a thin conductive film disposed along the peripheral edge portion of the transparent substrate.

(2) To solve the problems described above, the present invention further provides a display device comprising:

a first substrate formed with a plurality of video signal lines, a plurality of scanning signal lines intersecting the video signal lines, electrode terminals receiving a driving signal and a control signal from the video signal lines, the scanning signal lines, and an external system, and a third signal interconnect connecting the video signal lines and the scanning signal lines with the electrode terminals; and a flexible interconnect substrate connected to the first substrate, the flexible interconnect substrate used for supplying the driving signal to the video signal lines and the scanning signal lines by way of the electrode terminals and the third signal interconnect;

a region surrounded by the video signal lines and the scanning signal lines being a pixel area;

a region where the pixels are formed in a matrix being a display area;

the third signal interconnect being formed in a region outside the display area; and a fourth signal interconnect disposed outside the third signal interconnect but near the peripheral edge of the transparent substrate, the fourth signal interconnect surrounding the area where the display area is included and the third signal interconnect is formed, the fourth signal interconnect being opened at opposite ends thereof and being connected to respective electrode terminals for inspection at the open ends;

wherein the fourth signal interconnect is formed of a conductive thin film disposed along the peripheral edge portion of the transparent substrate.

According to the present invention, pass/failure of signal interconnects for substrate chipping or cracking can simply be examined without increase in the number of manufacturing steps.

Other effects of the invention will become apparent with reference to the entire description in the specification.

DESCRIPTION OF PREFERRED EMBODIMENTS

Preferred embodiments of the present invention will be described with reference to the drawings. In the following explanation, identical constituent elements carry the same references for which duplicate descriptions are to be omitted.

Embodiment 1

Entire Constitution

Figure 1:
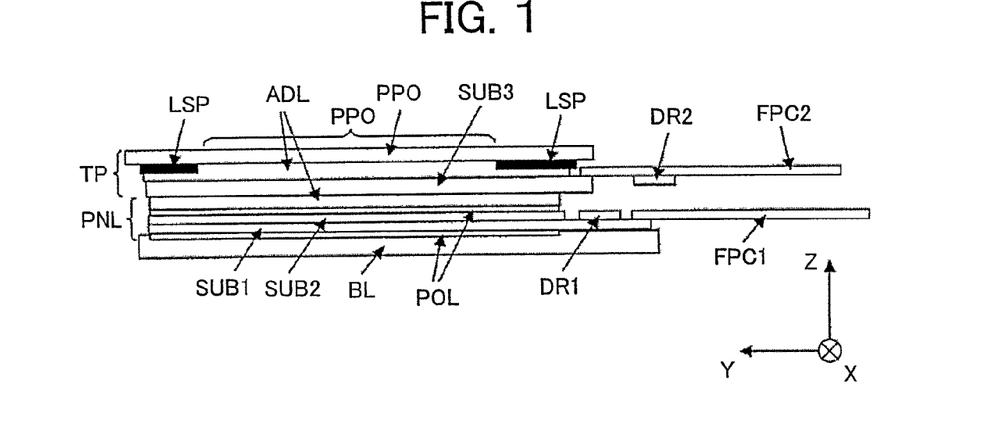
FIG. 1 is a cross sectional view for explaining the entire constitution of a liquid crystal display device as a display device according to Embodiment 1 of the invention.

FIG. 1 is a cross sectional view for explaining the entire constitution of a liquid crystal display device as a display device according to Embodiment 1 of the invention, and the display device of the Embodiment 1 will be described with reference to FIG. 1. The constitution other than that of detection interconnects in the liquid crystal display device of Embodiment 1 is identical with that of well-known liquid crystal display devices. Accordingly, the detection interconnect will be described specifically in the following description. Further, X, Y, and Z in the drawing show X axis, Y axis, and Z axis respectively. Further, while description of Embodiment 1 is to be made of a liquid crystal display panel as the display panel, it is not restricted thereto but may also be a constitution using, for example, an organic EL display panel, etc.

As shown in FIG. 1, a display device of Embodiment 1 includes a liquid crystal display panel PNL, and a capacitive touch panel (coordinate input device) TP attached to the liquid crystal display panel PNL on the side of the display surface (frontal side). The display device can detect the coordinate position in the direction XY on the liquid crystal display panel PNL. The liquid crystal display panel PNL is bonded to the touch panel TP by a transparent, that is, light permeable adhesive ADL. On the other hand, a backlight device BL is disposed on the liquid crystal display panel PNL on the side of the back surface opposite the display surface. However, the touch panel TP is not restricted to the capacitive type but may be a touch panel of other type such as a resistive type. Further, for bonding of the liquid crystal display panel PNL and the tough panel TP, a pressure sensitive adhesive such as a silicon gel which can be peeled and re-bonded may also be used instead of the adhesive ADL.

The liquid crystal display panel PNL includes a first substrate SUB1 and a second substrate SUB2. The substrates SUB1 and SUB2 are opposed by way of a liquid crystal layer (not illustrated). The first substrate SUB1 is larger than the second substrate SUB2 in the direction of Y axis. A driving circuit DR1 and a flexible printed substrate FPC1 are disposed on the first substrate SUB1 on the side of the main surface (liquid crystal surface) corresponding to the region greater than the second substrate SUB2, that is, exposed from the second substrate SUB2. The driving circuit DR1 supplies driving signals to pixels (not illustrated). The flexible printed substrate FPC1 supplies external signals, etc. to the driving circuit DR1. Further, well-known polarizing plates POL are disposed on the first substrate SUB1 on the side of the back surface, that is, on the side of the backlight device BL, and on the second substrate SUB2 on the side of the display surface respectively.

On the other hand, the touch panel TP includes a third substrate SUB3. A detection electrode (not illustrated) for detecting a contact position is formed on the side of the main surface of the third substrate SUB3, that is, on the side of a viewer. A flexible printed substrate FPC2 is connected to the end of the third substrate SUB3. The flexible printed substrate FPC2 includes a driving circuit DR2 for the touch panel TP provided on the side of the terminal surface. The driving circuit DR2 supplies driving signals to a detection electrode and detects the position of finger contact based on the capacitance change in driving signals supplied to the detection electrode. Further, a light shielding plate LSP and a protective plate (front protective plate) PP are bonded to the third substrate SUB3 by the adhesive ADL on the side of the main surface thereof.

(Constitution of Liquid Crystal Display Panel and Touch Panel)

Figure 2:
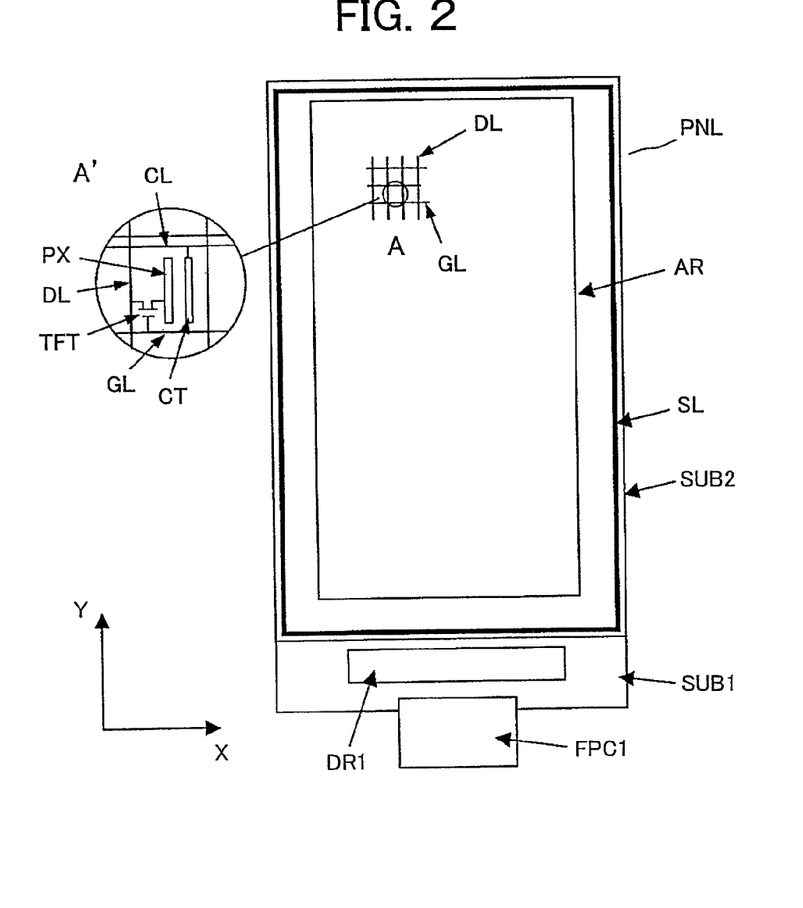
FIG. 2 is a diagram for explaining the schematic constitution of the liquid crystal display panel of Embodiment 1.
Figure 3:
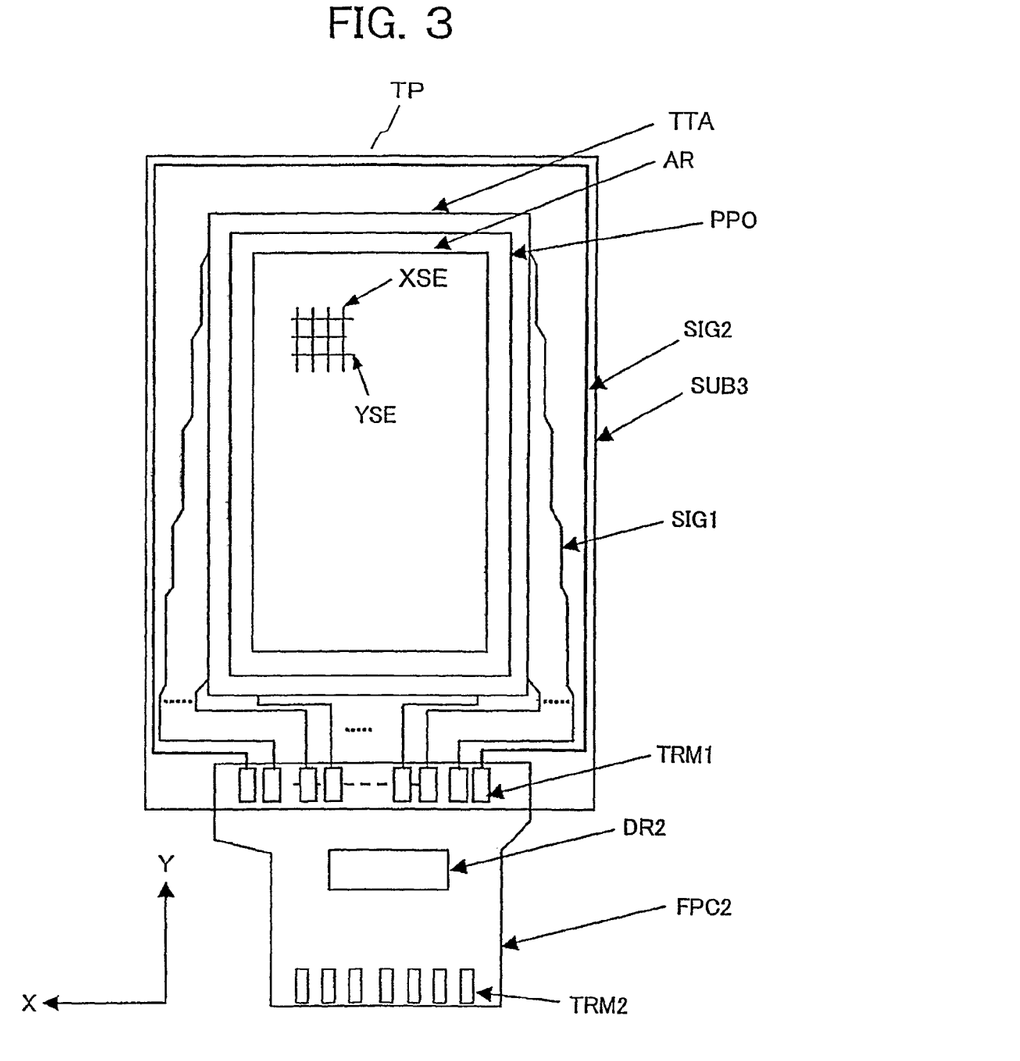
FIG. 3 is a diagram for explaining the schematic constitution of a touch panel according to Embodiment 1.

Then, a diagram for explaining the schematic constitution of the liquid crystal display panel of Embodiment 1 is shown in FIG. 2. A diagram for explaining the schematic constitution of the touch panel of Embodiment 1 is shown in FIG. 3. The liquid crystal display device of Embodiment 1 will be described specifically with reference to FIGS. 2 and 3. FIG. 3 is a plan view of the touch panel of Embodiment 1 as viewed from the side of the liquid crystal display panel. X and Y shown in FIGS. 2 and 3 represent respectively X-axis and Y-axis, which correspond to X-axis and Y-axis shown in FIG. 1.

Referring to FIG. 2, the liquid crystal display panel PNL of Embodiment 1 includes a first substrate SUB1, a second substrate SUB2, and a liquid crystal layer (not illustrated). The first substrate SUB1 is formed with pixel electrodes PX, thin film transistors TFT, etc. The second substrate SUB2 is formed with a color filter (not illustrated) and a black matrix, the second substrate SUB2 being opposed to the first substrate SUB1. The liquid crystal layer (not illustrated) is put between the first substrate SUB1 and the second substrate SUB2. Further, an unillustrated backlight unit (backlight device) as a light source for the liquid crystal display panel PNL is provided on the side of the rear face. Such a backlight is combined with the liquid crystal display panel PNL so as to provide image display. The first substrate SUB1 and the second substrate SUB2 are fixed by means of a seal member SL applied in a circular shape at the periphery of the second substrate and also the liquid crystal is sealed thereby. In the following description, the liquid crystal display panel PNL is also referred to as a liquid crystal display device.

The first substrate SUB1 and the second substrate SUB2 are generally formed, for example, of a well known glass substrate as the substrate but the material is not restricted only to the glass substrate but other insulative substrates such as quartz glass or plastic (resin) may also be used. For example, the use of quartz glass allows the process temperature to be increased. Thus the thin film transistor TFT has a densified gate insulating film, leading to improvement in reliability. In contrast, the use of a plastic (resin) substrate provides a liquid crystal display device light in weight and satisfactory in impact resistance.

Further, the liquid crystal display panel PNL of Embodiment 1 is such that a region formed with display pixels (hereinafter simply referred to as pixel) forms a display area AR in a region in which the liquid crystal is sealed. Accordingly, even if the liquid crystal is sealed in a region, that region not formed with the pixels and not used for display does not serve as the display area AR.

In the liquid crystal display device of Embodiment 1, scanning signal lines (gate lines) GL extends in the direction X and juxtaposed in the direction Y, while video signal lines (drain lines) DL extends in the direction Y and juxtaposed in the direction X in the surface of the first substrate SUB1 on the side of the liquid crystals and within the display area AR. A rectangular region surrounded by the drain line DL and the gate line GL is a region where a pixel is formed by which the pixels are arranged in a matrix within the display area AR. As shown in an enlarged view A' of the circle A in FIG. 2, each of the pixels has a thin film transistor TFT, a pixel electrode PX, and a common electrode CT. The thin film transistor TFT is ON-OFF driven in response to a scanning signal from the gate line GL. The pixel electrode PX is supplied with a video signal from the drain line DL by way of the thin film transistor TFT when it is turned ON. The common electrode CT is connected with the common line CL and supplied with a common signal having a potential as a reference to the potential of the video signal.

An electric field containing a component parallel to the main surface of the first substrate SUB1 is generated between the pixel electrode PX and the common electrode CT, thereby driving liquid crystal molecules. Such a liquid crystal display device is known as a device capable of so-called wide view angle display and is referred to as an IPS system (including IPS-Pro system), or a lateral electric field system in that it has the specificity of the application of electric field to the liquid crystal. Further, the liquid crystal display device of such a structure performs display by a normally black display with which light transmittance is minimized when the electric field is not applied to the liquid crystal (black display) and increase in light transmittance is enhanced by applying the electric field. The liquid crystal display panel may also be a vertical electric field type such as TN system or VA system. With such a vertical electric field type liquid display panel, a common electrode CT is forming on the second substrate SUB2 on the side of the main surface (on the side of the liquid crystal surface) and drives liquid crystal molecules by an electric field generated between the pixel electrode PX formed on the first substrate SUB1 and the common electrode CT formed on the second substrate SUB2.

Each of the drain lines DL and each of the gate lines GL are extended at their ends beyond the seal material SL respectively and connected to the driving circuit DR. In the liquid crystal display device of Embodiment 1, the driving circuit DR is formed of a semiconductor chip and is mounted on the first substrate SUB1. However, the liquid crystal display device of Embodiment 1 may mount, on the flexible printed substrate FPC, one or both of a video signal driving circuit of outputting the video signal and a scanning signal driving circuit of outputting the scanning signal in the form of a tape carrier system or a COF (chip on film) system, whereby the driving circuit is connected to the first substrate SUB1.

In the structure of the common electrode CT shown in the enlarged view A', a common signal is inputted by way of the common line CL to the common electrodes CT formed independently on every pixel. However this is not limitative but the common electrodes CT may be formed so that the common electrodes CT for the pixels disposed in adjacent with each other in the direction X are connected directly, and a common signal may be inputted by way of the common line CL from one end or both of right and left ends in the direction X (end of the first substrate SUB1).

(Constitution of Touch Panel)

As shown in FIG. 3, the touch panel TP of Embodiment 1 also has a third substrate SUB3 comprising a flat transparent glass substrate or plastic substrate. The touch panel TP has electrodes formed on the third substrate SUB3 on the side of the main surface thereof (liquid crystal display panel) in this embodiment. The electrodes are used to detect a position of contact with an operator's finger (not illustrated), etc. For example, first detection electrodes YSE extend in the direction X and are juxtaposed in the direction Y for detecting the coordinate position in the direction Y. Second detection electrodes XSE extend in the direction Y and are juxtaposed in the direction X for detecting the coordinate position in the direction X, with the electrodes YSE and electrodes XSE being intersected by way of an insulating film (not illustrated). In Embodiment 1, the first detection electrodes YSE and the second detections electrode XSE are formed in the transparent region TTA of the touch panel TP, thereby allowing for detection of the coordinate positions in the direction X and in the direction Y within the transparent region TTA. Since the liquid crystal display panel PNL is disposed at the back of the touch panel TP, the first detection electrodes YSE and the second detection electrodes XSE, and an unillustrated insulating film which are formed within the transparent region TTA should be formed of a transparent material so that an operator can view the display content displayed on the liquid crystal panel.

Further, in the touch panel TP of Embodiment 1, a signal interconnect (first signal interconnect) SIG1 for connecting the first detection electrodes YSE and the second detection electrodes XSE with an electrode terminal (first electrode terminal) TRM1 is disposed in the region outside the transparent region TTA. In this case, the first detection electrodes YSE are juxtaposed in the direction Y. Accordingly, the signal interconnect SIG1 connected to the ends of the first detection electrodes YSE are formed between the right and left of the transparent region TTA and the periphery of the third substrate SUB3 in the drawing and connected with the electrode terminal TRM1. Further, the second detection electrodes XSE are juxtaposed in the direction X. Accordingly, the second detection electrodes XSE are connected to the electrode terminal TRM1 by the signal interconnect SIG1 formed in a region between the lower portion of the transparent region TTA in the drawing and the electrode terminal TRM1.

Further, in the touch panel TP of Embodiment 1, the opening PPO of the light shielding plate LSP is formed smaller than the transparent region TTA and larger than the display area AR of the liquid crystal display panel. With such a constitution, the contact position associated with the image displayed at the end of the display area AR is detected reliably. Further, the opening PPO is formed smaller than the transparent region TTA in which the first detection electrodes YSE and the second detection electrodes XSE are formed, thereby reliably detecting the contact position at the end of the transparent region TTA.

The touch panel TP of Embodiment 1 is configured such that a detection interconnect (second signal interconnect) SIG2 is formed outside of the signal interconnect SIG1. In particular, the detection interconnect SIG2 of Embodiment 1 is formed along the peripheral edge portion corresponding to sides (upper side and right and left sides in FIG. 3) other than one side in which the electrode terminals of the third substrate SUB3 are formed. Further, in Embodiment 1, the interconnect width and the position in forming the interconnect are properly determined according to the accuracy of the exposure device and the etching device, etc. used for forming the detection interconnect SIG2 on the third substrate SUB3, and the allowance for the size of substrate chipping NP when it is present. Further, the interconnect width of the detection interconnect SIG2 is formed such that the interconnect width is uniform. However, the interconnect width of the detection interconnect SIG2 is not always restricted to the uniform interconnect width. A plurality of electrode terminals TRM1 are arranged along one side of the third substrate SUB3. For the detection interconnect SIG2 of Embodiment 1, one end of the detection interconnect SIG2 is connected to one of a pair of the outermost terminals of paired electrode terminals TRM1 arranged along one side of the third substrate SUB3, and the other end of the detection interconnect SIG2 is connected to the other of a pair of the outermost terminals of the paired electrode terminals TRM1. Further, the detection interconnect SIG2 of Embodiment 1 is formed of a thin metal film such as aluminum of low transmittance to light (particularly, light in a visible region). As described above, the signal interconnect SIG1 and the detection interconnect SIG2 are formed in an identical layer and they can be formed in one identical step by forming the detection interconnect SIG2 using a thin metal film such as of aluminum used for forming the signal interconnect SIG1. This can exhibit a particularly satisfactory effect of forming the detection interconnect SIG2 without increase in the number of manufacturing steps. Further, by making the detection interconnect SIG2 of the low transmittance thin metal film, disconnection inspection for the detection interconnect SIG2 by inspector's visual observation upon generation of chipping or cracking in the third substrate SUB3 can be performed with ease.

The detection interconnect SIG2 may also be formed of two or more laminate thin films, where at least one single layer of the laminate film is made of a material of lower transmittance than that of the adjacent region. Further, a colorant material may be incorporated in at least one layer of the laminate film forming the detection interconnect SIG2 (colored layer). With such a constitution, the same effect can be exhibited as that attained when the detection interconnect SIG2 is made of a low transmittance thin single film layer.

Figure 8:
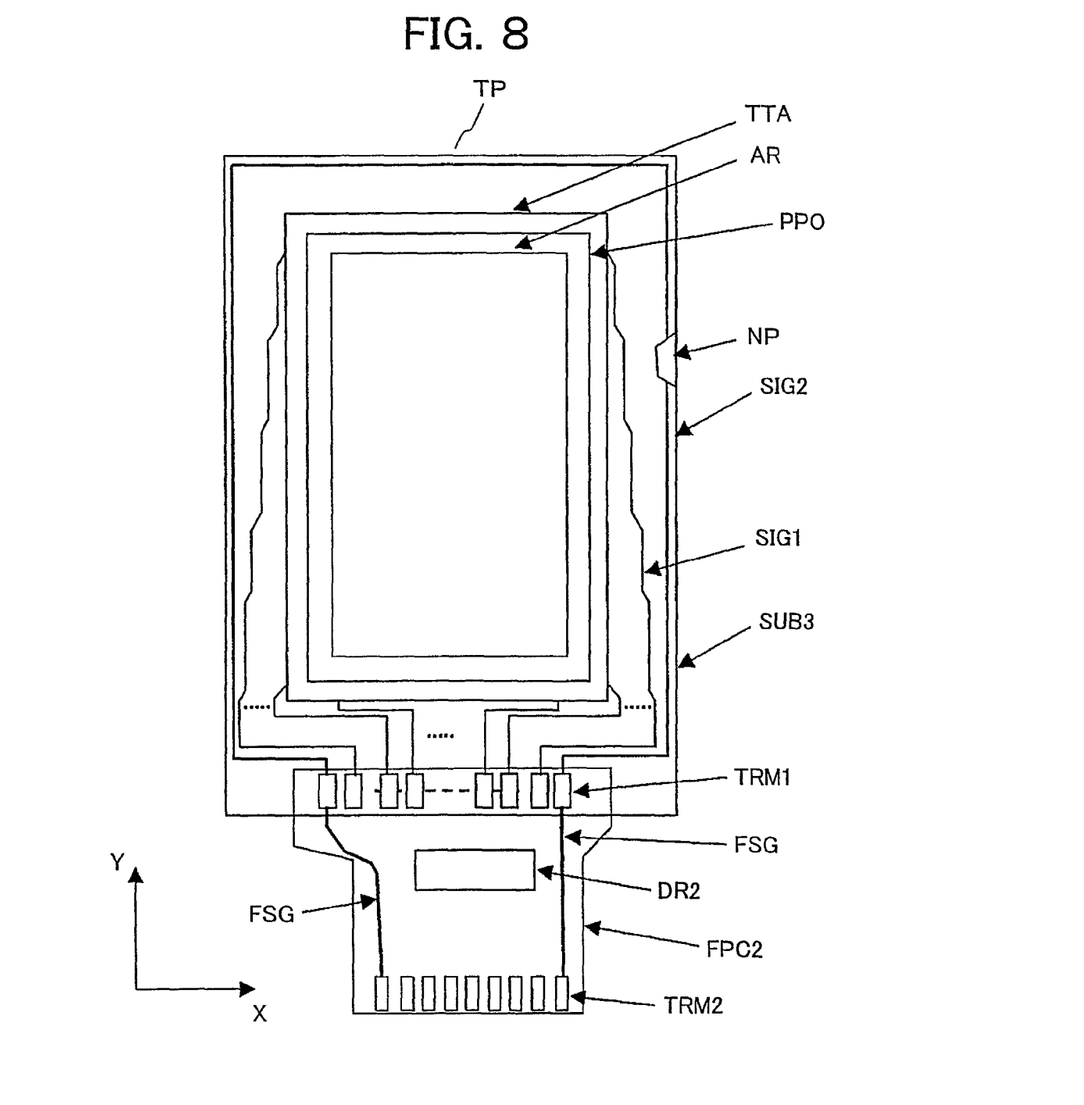
FIG. 8 is a diagram for explaining a schematic constitution of a flexible printed substrate in a tough panel of Embodiment 1.

Further, the touch panel TP of Embodiment 1 is configured such that electrode terminals (not illustrated) of the flexible printed substrate FPC2 are connected electrically to the electrode terminals TRM1 of the tough panel TP. In this case, a driving signal from the driving circuit DR2 is supplied by way of the electrode terminal TRM1, and a detection signal is outputted to the driving circuit DR2. As shown in FIG. 8, in the flexible printed circuit FPC2 of the touch panel TP in Embodiment 1, the electrode terminals (second electrode terminals) TRM2 formed on the flexible printed substrate FPC2 in the lower portion of the drawing have electrode terminals connected electrically with the detection interconnect SIG2. Specifically, the paired electrode terminals TRM2 disposed on the outermost side among the electrode terminals TRM2 on the side connected to an external system (not illustrated) are electrically connected with the detection interconnect SIG2 by way of signal interconnects FSG on the flexible printed substrate FPC.

(Detection of Substrate Chipping)

Figure 4:
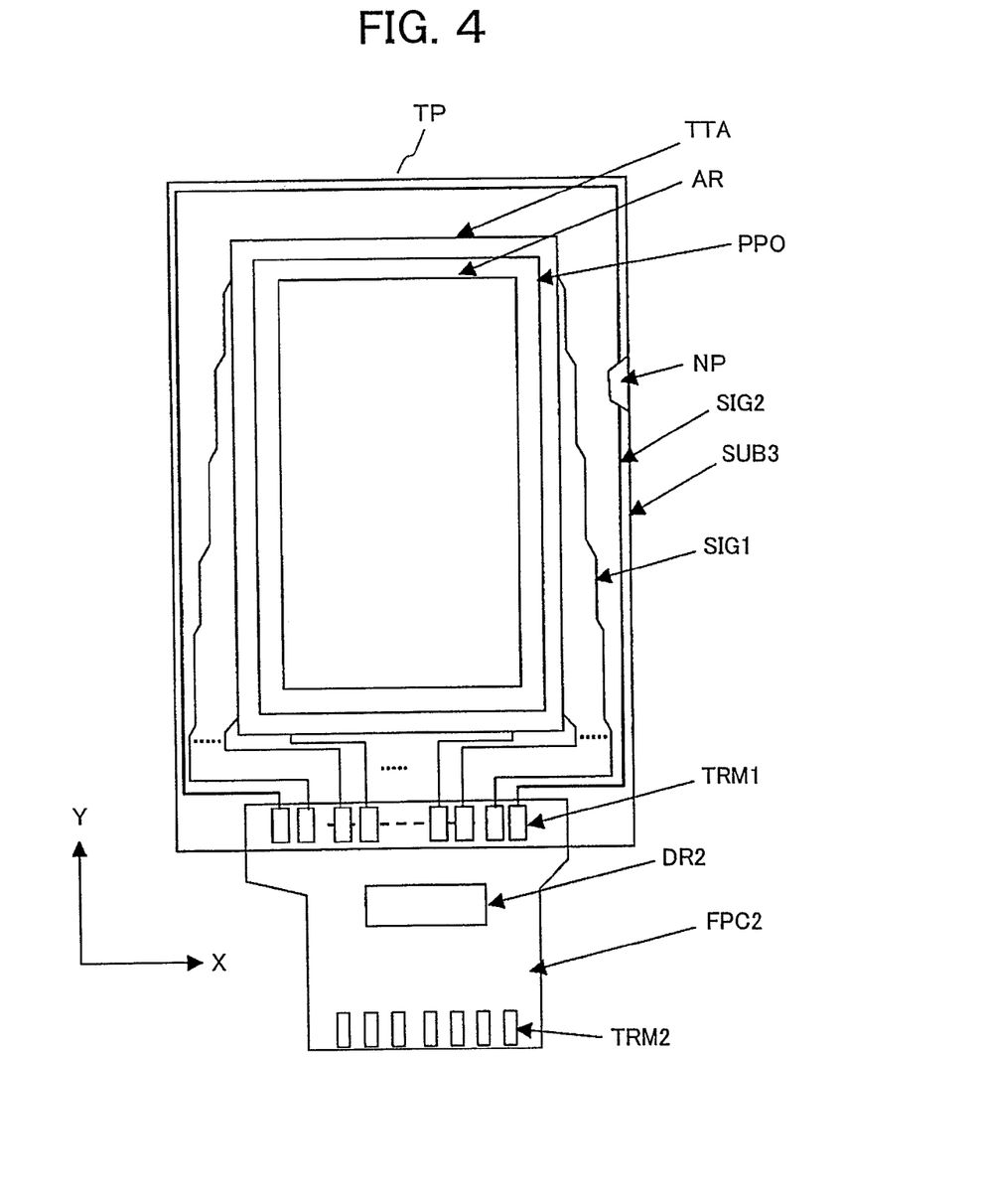
FIG. 4 is a view in which chipping occurs in a third substrate of a touch panel in the liquid crystal display device of Embodiment 1 shown in FIG. 3.

FIG. 4 is a diagram showing a situation where chipping occurs in the third substrate of the touch panel in the liquid crystal display device of Embodiment 1 shown in FIG. 3. The detection operation in the case where chipping (substrate chipping) NP occurs in the third substrate SUB3 of the tough panel will be described with reference to FIG. 4.

The touch panel TP of Embodiment 1 includes a detection interconnect SIG2 formed along the peripheral edge portion of a third substrate SUB3. As a result, if chipping NP occurs in the third substrate SUB3 due to handling or other works of the touch panel after the detection interconnect SIG2 has been formed, then a portion of the detection interconnect SIG2 is absent together with the substrate chipping NP, resulting in disconnection, as shown in FIG. 4. When the region of the substrate chipping NP has a predetermined size or more, an inspector can easily find (detect) the chipping NP by visual observation because the detection interconnect SIG2 of Embodiment 1 is formed of a material having a low transmittance or permeability.

Further, also when chipping NP occurs in the third substrate SUB3 due to handling or other works upon bonding of the touch panel TP to the liquid crystal display panel PNL, a portion of the detection interconnect SIG2 is absent together with the substrate chipping NP, resulting in disconnection, as shown in FIG. 4. In this case, as shown in FIG. 1, since the chipping NP occurrence location in the third substrate SUB3 is a region put between a light shielding plate LSP and a liquid crystal display panel PNL, it was impossible to find such chipping NP with the existent constitution. By contrast, the touch panel TP of Embodiment 1 has the detection interconnect SIG2 formed of a single thin conductive film connected to the electrode terminal TRM1 at opposite ends. Therefore, presence or absence of disconnection of the detection interconnect SIG2 can be inspected by measuring a portion between the electrode terminals TRM2 led out to the flexible printed substrate FPC. This disconnection of the detection interconnect SIG2, that is, chipping NP in the third substrate SUB3 can be detected easily, for example, by measuring the resistance value between the electrode terminals TRM2 connected to the detection interconnect SIG2 with a measuring instrument for electric resistance or by inputting a pulse signal to one of the electrode terminals TRM2 and detecting the signal at the other electrode terminal TRM2. Further, based on the result of the measurement by the disconnection inspection, when disconnection of the detection interconnection SIG2 is not detected, it can be judged that no chipping NP occurs in the third substrate SUB3, or judged that there is chipping NP within the predetermined allowance even when chipping NP occurs. On the other hand, if disconnection of the detection interconnect SIG2 is detected, it can be judged that chipping NP over the allowance, which affects also the signal interconnect SIG1, occurs. Further, disconnection by the measurement between the electrode terminals TRM2 connected with the detection interconnect SIG2 can be measured also before bonding with the liquid crystal display panel PNL.

By contrast, if the substrate chipping NP is small or cracking occurs in the direction Y in FIG. 4, then the region where the detection interconnect SIG2 is absent is remarkably small and it is quite difficult to find the same based on the visual inspection of an inspector. However, for the touch panel TP according to Embodiment 1, presence or absence of chipping NP or cracking in the third substrate SUB3 can be inspected by a simple and convenient inspection, conduction test for the detection interconnect SIG2.

As has been described above, the display device of Embodiment 1 has a capacitive type touch panel disposed on the liquid crystal display panel on the side of the display surface, the liquid crystal display panel displaying images based on the video signals from an external system. The tough panel of Embodiment 1 includes the detection interconnect made of the thin electroconductive metal film of a low transmittance extended along the peripheral edge portion of the third substrate in such a manner as to surround the region in which to form the signal interconnect for connecting the first and second detection electrodes with the electrode terminals and to surround the transparent region where the contact position can be detected, with the detection interconnect having one end connected to the electrode terminal and the other end connected to the other electrode terminal. Accordingly, the inspector can easily inspect substrate chipping in the third substrate by visual observation before bonding of the liquid crystal display panel to the touch panel. In addition, the inspector can inspect substrate chipping by simple measurement such as measurement for resistance, pulse, or the like between the electrodes connected with the detection interconnect even after fixing of the liquid crystal display panel and the touch panel.

Embodiment 2

Figure 5:
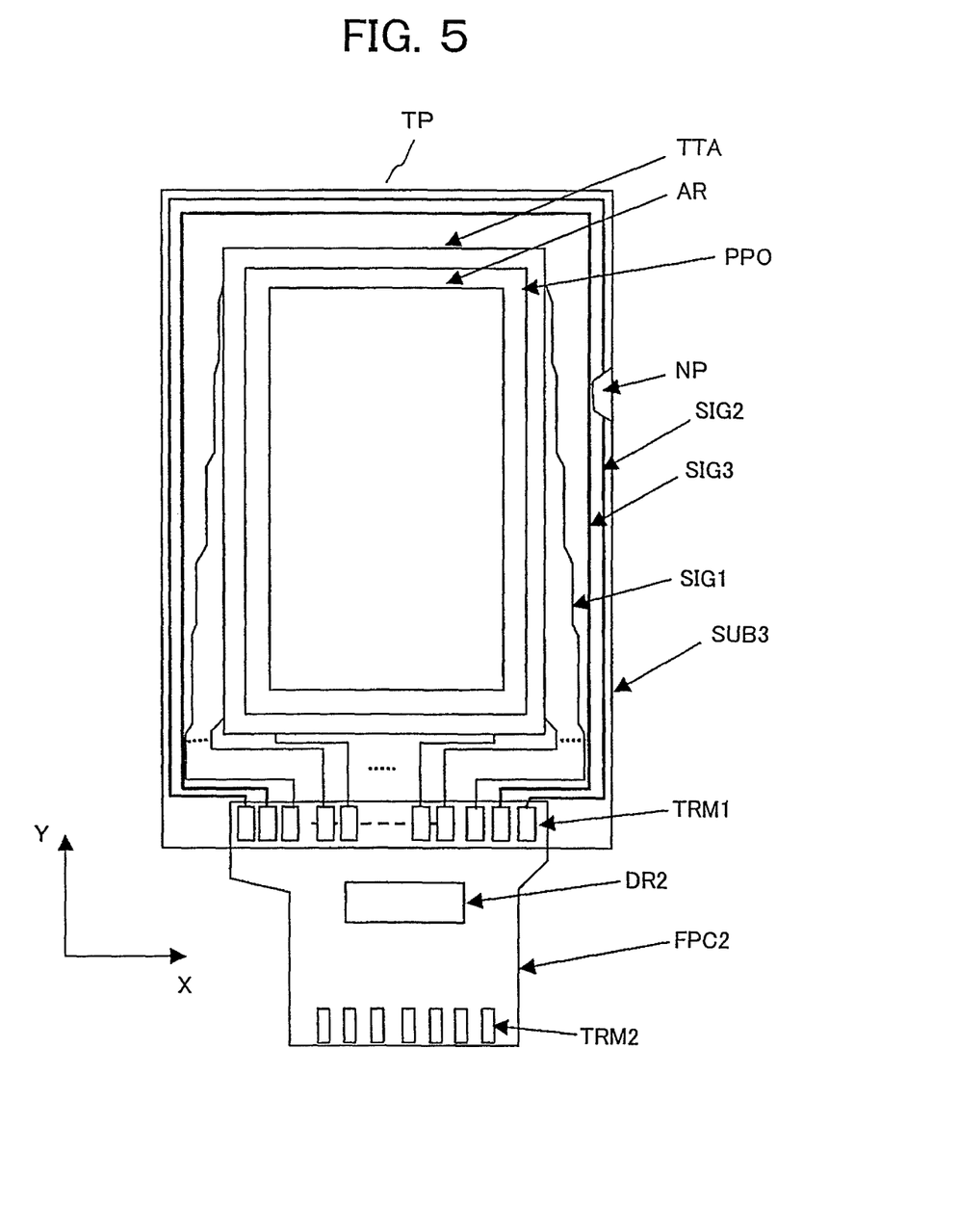
FIG. 5 is a diagram for explaining a schematic constitution of a touch panel in a display device according to Embodiment 2 of the invention.

FIG. 5 is a diagram for explaining a schematic constitution of a touch panel in a display device according to Embodiment 2 of the invention. FIG. 5 particularly is a front elevational view corresponding to FIG. 4 of Embodiment 1, that is, a front elevational view showing a touch panel in the case where a substrate chipping occurs at one location of a third substrate of the touch panel. However, the display device of Embodiment 2 is different from that of the display device of Embodiment 1 in constitution only for the detection interconnects SIG2 and SIG3 and the electrode terminals TRM1 and TRM2 of the touch panel TP, and the constitution of the liquid crystal display panel and other constitution of the touch panel are identical with that of the display device of Embodiment 1. Accordingly, the following contains detailed description of the constitution of the detection interconnects SIG2, SIG3, and the electrode terminals TRM included in the touch panel. In the following description, the detection interconnect on the side nearer to the peripheral edge portion of the substrate SUB3 is referred to as a first detection interconnect SIG2, and the detection interconnect on the side distant from the peripheral edge portion of the third substrate SUB3 is referred to as a second detection interconnect SIG3. Further, while Embodiment 2 includes description made of an example having two independent detection interconnects SIG2 and SIG3, three or more independent detection interconnects may be formed.

As shown in FIG. 5, also the touch panel TP of Embodiment 2 has a third substrate comprising a flat transparent glass substrate and has two different detection interconnects SIG2 and SIG3. Further, each of the detection interconnects SIG2 and SIG3 is formed in a region outside the interconnect region where the interconnect of the signal interconnect SIG1 is formed, that is, in a region between the signal interconnect SIG1 and the peripheral side of the third substrate SUB3, similar to Embodiment 1. Further, also the detection interconnects SIG2 and SIG3 of Embodiment 2 are formed along the peripheral edge portion of sides (upper side and right and left sides in FIG. 5) other than one side in which the electrode terminals TRM1 of the third substrate SUB3 are formed. In the touch panel TP of Embodiment 2, a first detection interconnect SIG2 is disposed on the side near to the peripheral edge portion of the third substrate SUB3 and a second detection interconnect SIG3 is disposed on the side distant from the peripheral edge portion of the third substrate SUB3, that is, on the side near to the signal interconnect SIG1.

For the first detection interconnect SIG2 of Embodiment 2, one end of the first detection interconnect SIG2 is connected to one of a pair of the outermost terminals of paired electrode terminals TRM1 arranged along one side of the third substrate SUB3 (lower portion in FIG. 5), and the other end of the second detection interconnect SIG3 is connected to the other of a pair of the outermost terminals of the paired electrode terminals TRM1. Further, for the second detection interconnect SIG3, ends of the second detection interconnect SIG3 are connected to the electrode terminals TRM1 adjacent inwardly of the paired electrode terminals TRM1 connected with the first electrode interconnect SIG2. With the constitution described above, the first detection interconnect SIG2 and the second detection interconnect SIG3 can be formed on the same layer as is the signal interconnect SIG1, that is, they can be manufactured by the same step and same interconnect material as is the signal interconnect SIG1.

The same satisfactory effect as that described for Embodiment 1 can be obtained by forming the first detection interconnect SIG2 and the second detection interconnect SIG3 in the same step as that for the signal interconnect SIG1. Further, a conductive transparent thin film layer may be formed in the same step as is the first detection electrodes YSE or the second direction electrodes XSE and then the first detection interconnect SIG2 and the second detection interconnect SIG3 comprising a laminate of a conductive or non-conductive colored layer, etc. may be formed. In this case, signal interconnects comprising different thin film materials may be provided, for example, by forming the first detection interconnect SIG2 in the same step as that for the signal interconnect SIG1 and forming the second detection interconnect SIG3 in the same step as that for the first detection electrodes YSE or the second detection electrodes XSE. Thin film materials for the first detection interconnect SIG2 and the second detection interconnect SIG3 may be other thin film materials so long as they form a thin conductive film at low transmittance to light in a visible light region. By forming the detection interconnect SIG2 with such a thin metal film at low transmittance, an inspector can easily inspect, by visual observation, disconnection of the first detection interconnect SIG2 and the second detection interconnect SIG3 when chipping or cracking of the third substrate SUB3 occurs.

Further, also in the touch panel TP of Embodiment 2, electrode terminals TRM1 connected electrically with the first detection interconnect SIG2 and the second detection interconnect SIG3 respectively are formed for the electrode terminals TRM2 formed in the lower portion of the flexible printed substrate FPC2 in the drawing.

Then, an inspection method for substrate chipping NP in the touch panel TP of Embodiment 2 will be described with reference to FIG. 5. In the following, description will be made of a situation where the end of the substrate chipping NP terminates at a portion between the first detection interconnect SIG2 and the second detection interconnect SIG3 as shown in FIG. 5.

If chipping NP occurs in the third substrate SUB3 due to handling or other works of the touch panel after the detection interconnect SIG2 is formed and before the touch panel is fixed to the liquid crystal display panel, a portion of the detection interconnect SIG2 is absent together with the substrate chipping NP, resulting in disconnection, as shown in FIG. 5. In this situation, since the first detection interconnect SIG2 is formed of a low transmittance material or an impermeable material, the inspector can easily find (detect) the chipping NP by visual observation as long as the touch panel is not bonded to the liquid crystal display panel. On the other hand, if chipping NP occurs in the third substrate during the bonding step of the touch panel to the liquid crystal display panel or during the subsequent handling, then presence or absence of disconnection of the detection interconnect SIG2 can be inspected by measuring a portion between the electrode terminals TRM2 led out to the flexible printed substrate FPC. The reason is that both ends of each of the first detection interconnect SIG2 and the second detection interconnect SIG3 are connected with the electrode terminals TRM2 by way of the electrode terminals TRM1.

In the touch panel TP of Embodiment 2, the first detection interconnect SIG2 and the second detection interconnect SIG3 are detection interconnects independent of each other along the peripheral edge portion of the third substrate SUB3. Accordingly, based on the result of measurement in the disconnection inspection for the first detection interconnect SIG2 and the second detection interconnect SIG3, with the inspection being so simple and convenient inspection, it is possible to recognize the presence or absence for the occurrence of the substrate chipping NP in the third substrate SUB3, which is the same effect as that of Embodiment 1 described previously. In addition, it is possible to recognize the size for the substrate chipping NP, that is, how much the substrate chipping NP occur. For example, when disconnection is not detected for the two first detection interconnect SIG2 and the second detection interconnect SIG3, it can be judged that no chipping NP occurs in the third substrate SUB3, or it can be judged that quite slight substrate chipping NP occurs within an allowable range even if the chipping NP occurs. Further, as shown in FIG. 5, if it is detected that disconnection occurs in only the first detection interconnect SIG2, then it can be judged that the substrate chipping NP occurs but levels of substrate chipping NP fall within a predetermined allowable range. In contrast, if disconnection is detected in both of the detection interconnects of the first detection interconnect SIG2 and the second detection interconnect SIG3, it can be judged that substrate chipping NP over the allowance, which affects also the signal interconnect SIG1, occurs.

Likewise, also in a case where cracking occurs on the third substrate SUB3, cracking can be judged in the same manner as the substrate chipping NP based on the result of detection for the two detection interconnects, that is, the first detection interconnect SIG2 and the second detection interconnect SIG3. Thus the presence or absence for the occurrence of cracking in the third substrate SUB3, and the size of cracking, that is, the how much cracking occurs can be recognized by a simple and convenient inspection.

The touch panel TP of Embodiment 2 has such a configuration that the first detection interconnect SIG2 and the second detection interconnect SIG3 are independent of each other. Thus presence or absence of disconnection in the interconnects can be measured by different measuring methods even when the presence or absence of the disconnection in the two detection interconnects is measured collectively. For example, it is possible to measure a resistance value by applying a DC voltage to the corresponding electrode terminals in the measurement for the presence or absence of disconnection in the first detection interconnect SIG2. On the other hand, for the measurement for the presence or absence of the disconnection in the second detection interconnect SIG3, a pulse voltage is applied to the corresponding electrode terminals, thereby measuring the output from the electrodes.

In Embodiment 2, while description has been made of an example of a detection interconnect where the first detection interconnect SIG2 and the second detection interconnection SIG3 comprise the same thin film material formed in one identical layer, they are not limitative. For example, at least one of the detection interconnects of the first detection interconnect SIG2 and the second detection interconnect SIG3 may be formed of a thin metal film having a lower transmittance than that of the other detection interconnect. Only one of the detection interconnects may have a colored layer of an optional color. Further, while it has been explained for Embodiment 2 to an example where the first detection interconnect and the second detection interconnect are formed of a uniform interconnect width, and the interconnect width, etc. are identical between the first detection interconnect and the second detection interconnect, they are not limitative but they may be formed of different interconnect widths or different colors.

Embodiment 3

Figure 6:
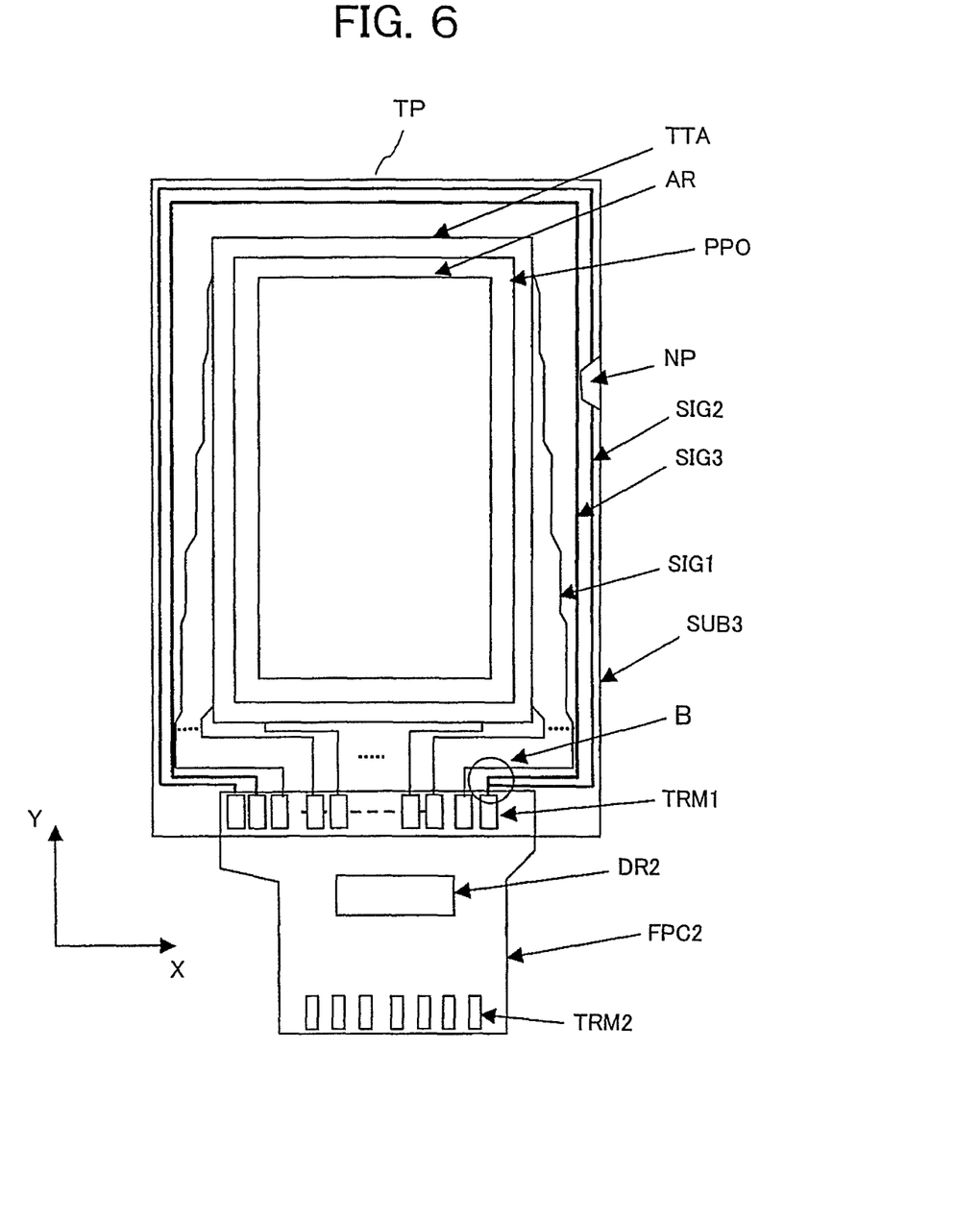
FIG. 6 is a diagram for explaining a schematic constitution of a touch panel in a display device according to Embodiment 3 of the invention.

FIG. 6 is diagram for explaining the schematic constitution of a touch panel in a display device according to Embodiment 3 of the invention, which is a front elevational view showing a touch panel in which substrate chipping NP identical with that in Embodiment 2 occurs. However, the display device of Embodiment 3 is different from that of the display device of Embodiment 2 in constitution only for the detection interconnects SIG2 and SIG3 and the electrode terminals TRM1 and TRM2 of the touch panel TP. The constitution of the liquid crystal display panel and other constitution of the touch panel are identical with the display device of Embodiment 2. Accordingly, the following contains detailed description of the constitution of the detection interconnects SIG2, SIG3, and the electrode terminals TRM1 and TRM2.

As shown in FIG. 6, also in the touch panel TP of Embodiment 3, the first detection interconnect SIG2 is disposed on the side near to the peripheral edge portion of the third substrate SUB3 and the second detection interconnect SIG3 is disposed on the side distant from the peripheral edge portion of the third substrate SUB3, that is, on the side near the signal interconnect SIG1. In this case, respective one ends of the first detection interconnect SIG2 and the second detection interconnect SIG3 (on the left in FIG. 6) are connected with different electrode terminals TRM1 in the same manner as in Embodiment 2. On the other hand, respective other ends of the first detection interconnect SIG2 and the second detection interconnect SIG3 (on the right in the FIG. 6) are connected with an identical electrode terminal TRM1 as shown by a circle B in FIG. 6. Also the first detection interconnect SIG2 and the second detection interconnect SIG3 may be detection interconnects in the identical layer comprising an identical thin film material, or detection interconnects formed in different layers comprising different thin film materials in the same manner as in Embodiment 2.

As has been described above, in the touch panel TP of Embodiment 3, other ends of the first detection interconnect SIG2 and the second detection interconnect SIG3 (on the right in FIG. 6) are connected with an identical electrode terminal on the third substrate SUB3. This can provide an outstanding effect capable of decreasing the number of terminals for the electrode terminals TRM1 than that of Embodiment 2 in addition to the effect of Embodiment 2 described previously.

It is possible to decrease, in a flexible printed substrate FPC, the number of electrode terminals contacted and connected opposing to the electrode terminals TRM1 formed in the third substrate SUB3, the number of electrode terminals TRM2, as well as the number of signal interconnects electrically connecting the electrode terminals to each other. The cost of the flexible printed substrate FPC greatly depends on the shape and the area. Since the area of the flexible printed substrate FPC can be decreased by decreasing the number of the electrode terminals and the number of the signal interconnects, this can provide a satisfactory effect capable of decreasing the cost of the flexible printed substrate FPC, and, at the same time, capable of decreasing the cost of the tough panel TP and the display device of Embodiment 3 using the flexible printed substrate FPC.

Embodiment 4

Figure 7:
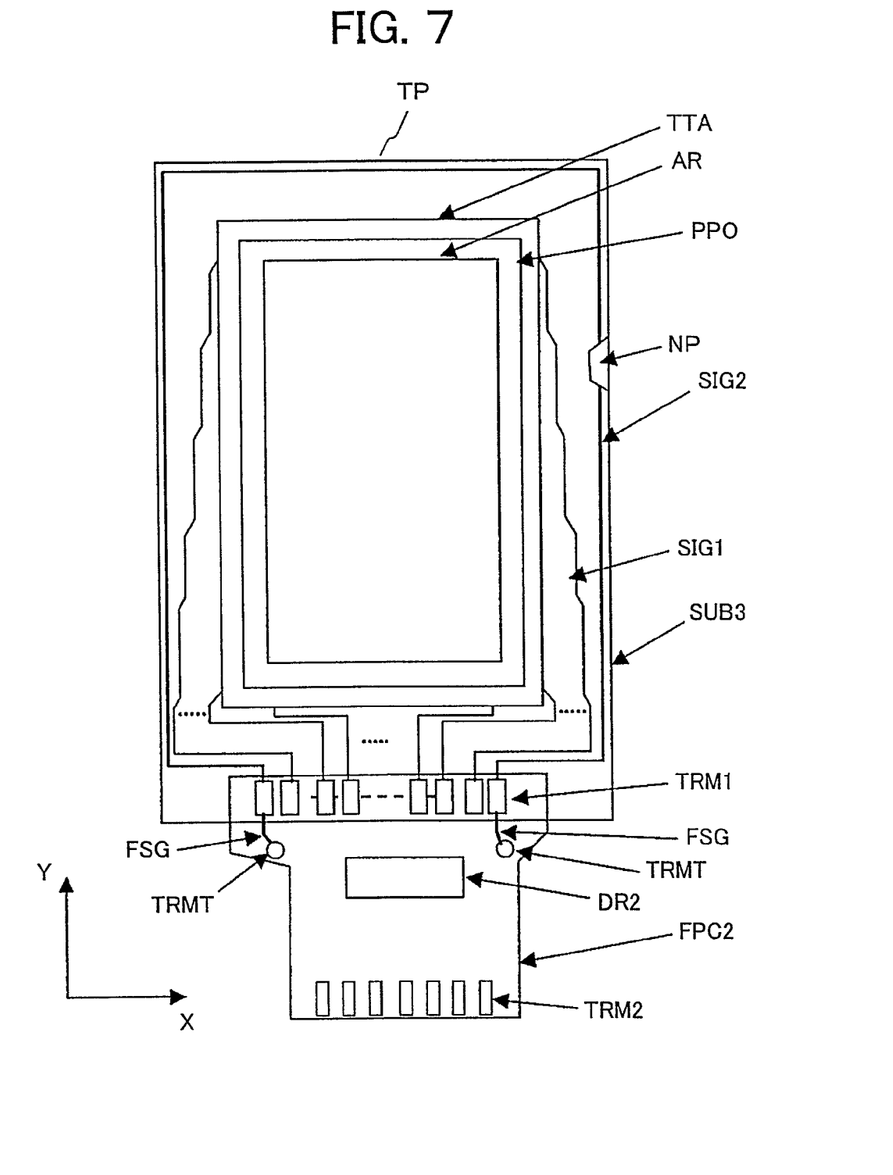
FIG. 7 is a diagram for explaining a schematic constitution of a touch panel in a display device according to Embodiment 4 of the invention.

FIG. 7 is a diagram for explaining a schematic constitution of a touch panel in a display device according to Embodiment 4 of the present invention, which is a front elevational view corresponding to FIG. 4 of Embodiment 1, that is, a front elevational view in which chipping occurs in the third substrate of the touch panel. However, the display device of Embodiment 4 is different in constitution only for the electrode terminals of the flexible printed substrate FPC of the tough panel TP and other constitutions are identical with that of Embodiment 1. Accordingly, in the following description, constitution of the flexible printed substrate FPC will be described specifically. Constitution of the flexible printed substrate FPC of Embodiment 4 is applicable also to the touch panel of Embodiments 2 and 3.

As shown in FIG. 7, the flexible printed substrate FPC of Embodiment 4 includes electrode terminals TRMT exclusively used for inspection corresponding to the detection interconnect SIG2 disposed at positions different from the positions where the electrode terminals TRM2 are formed. In particular, the electrode terminals TRMT of Embodiment 4 are formed at positions nearer to the electrode terminals TRM1 than the electrode terminals TRM2, that is, at positions near the main body of the touch panel TP. For obtaining such a constitution, the flexible printed substrate FPC of the touch panel TP according to Embodiment 4 has electrode terminals (not illustrated) of the same number connected to the electrode terminals TRM1 on the upper end in the drawing, that is, on the side connected with the third substrate SUB3. Further, the flexible printed substrate FPC has electrode terminals TRM2 by the number obtained by subtracting the number of the electrode terminals connected with the detection interconnect SIG2 from the number of the electrode terminals for the electrode terminals TRM1 on the side of the lower end in the drawing. In this case, the electrode terminals at the upper end portion and the electrode terminals TRM2 at the lower end of the flexible printed substrate FPC are connected respectively by signal interconnects (not illustrated) formed on the base material of the flexible printing substrate FPC and the signal interconnect SIG1 is electrically led out to the electrode terminals TRM2. Further, in the flexible printed substrate FPC of Embodiment 4, the electrode terminal (third electrode terminal) TRMT formed in a region (position) different from the electrode terminal TRM2 is connected with the electrode terminal on the flexible printed substrate FPC corresponding to the electrode terminal TRM1 connected with the detection interconnect SIG2 by way of the signal interconnect FSG in the flexible printed substrate FPC. The detection interconnect SIG2 is electrically led out to the flexible printed substrate FPC to the electrode terminal TRMT. The electrode terminal TRMT may also be formed to one surface or both surfaces of the flexible printed substrate FPC either on the side of the surface or on the side of the rear face.

As has been described above, in the Embodiment 4, the electrode terminal TRMT on the side of the flexible printed substrate FPC connected with the detection interconnect SIG2 is formed in a region different from the electrode terminal TRM1 connected to the signal interconnect SIG1. Thus there is exhibited a satisfactory effect of connecting measuring equipment to the electrode terminal TRMT and further shortening the time required for inspection in addition to the effect of the Embodiment 1.

Embodiment 5

Figure 9:
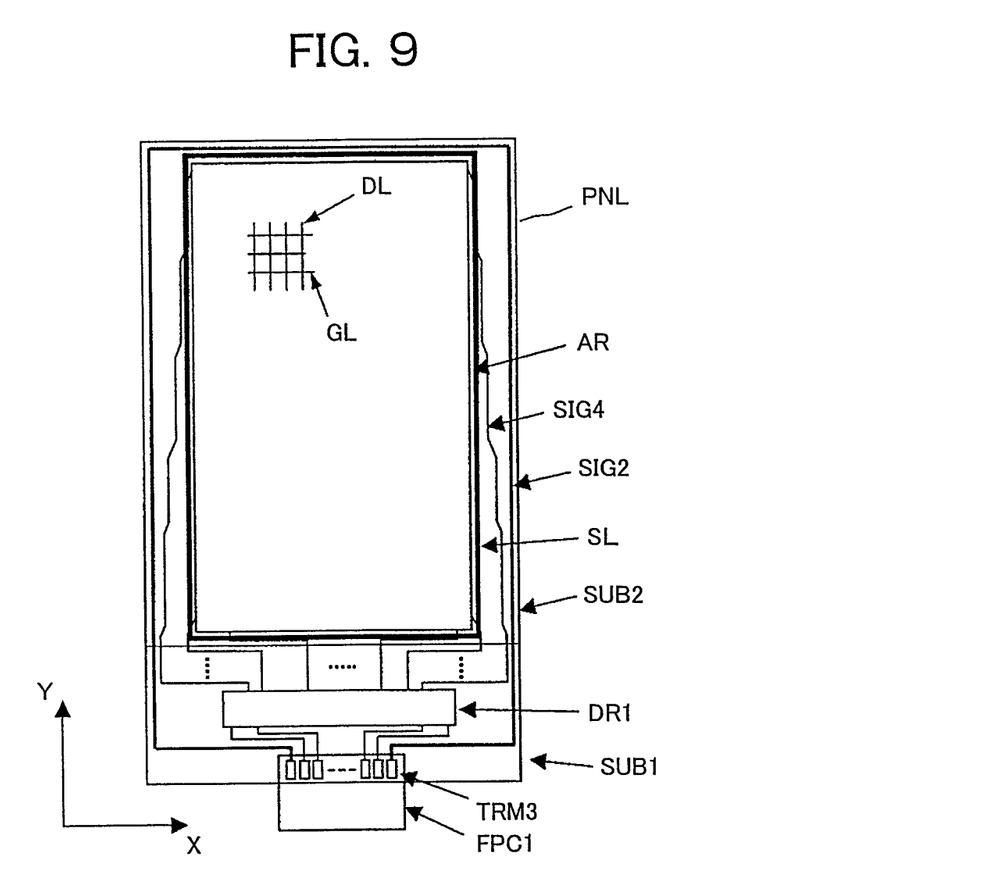
FIG. 9 is a diagram for explaining a schematic constitution of a liquid crystal display panel as a display device according to Embodiment 5 of the invention.

FIG. 9 is a diagram for explaining the schematic constitution of a liquid crystal display panel as a display device according to Embodiment 5 of the invention in which other constitutions except for the constitution of the detection interconnect SIG3 and the electrode terminals TRM3 are identical with those of the liquid crystal display panel of Embodiments 1 to 4. Accordingly, in the following description, the constitution of the detection interconnect SIG3 and the electrode terminals TRM3 will be described specifically. Further, for the liquid crystal display panel PNL according to Embodiment 5, description is to be made of an example of using a single detection interconnecting SIG3 in the same manner as in Embodiment 1, but a plurality of detection interconnects SIG3 may also be disposed in the same manner as in Embodiments 2 and 3. Further, the electrode terminals connected to the detection interconnect SIG3 may be disposed at positions different from those for the electrode terminals on the side receiving the display data, control signals, etc. that is, a group of electrode terminals juxtaposed on the side connected with the external system, in the electrode terminals (not illustrated) of the flexible printed substrate FPC in the same manner as in Example 4. In Embodiment 5, while the detection interconnect SIG3 is disposed on the liquid crystal display panel PNL as the display device in Embodiment 5, this is not limitative but applicable also to other display devices such as an organic EL display device.

As shown in FIG. 9, the drain lines DL and the gate lines GL formed in the display area AR is extended beyond the seal material SL and connected as a signal interconnect (third signal interconnect) SIG4 to the driving circuit DR1. Further, the driving circuit DR1 is connected also with the electrode terminal TRM3 by the signal interconnect SIG4, and the display data or control signals are inputted to the driving circuit DR1 by way of the flexible printed substrate FPC1 connected to a lower portion of the first substrate SUB1 in the drawing.

In the first substrate SUB1 constituting the liquid crystal display panel PNL of Embodiment 5, a detection interconnect (fourth signal interconnect) SIG2 is formed along the peripheral edge portion thereof. Ends of the detection interconnects SIG2 are connected to different electrode terminals TRM3 respectively, and led out by way of the flexible printed substrate FPC. In the liquid crystal display panel PNL of Embodiment 5, a common line (not illustrated) connected with the not illustrated common electrode and signal interconnects (not illustrated) connected with the common line are also formed inside the detection interconnect SIG2, that is, in a region surrounded by the detection interconnect SIG2.

In the liquid crystal display panel PNL of Embodiment 5, the driving circuit DR1 is disposed in the lower portion of the first substrate SUB1 in the drawing but the configuration for the driving circuit DR1 is not restricted thereto. For example, when a gate driving circuit forming a gate signal by thin film transistor are formed on the light and left of the display area AR in the drawing, the detection interconnect SIG3 is formed so as to surround the gate driving circuit and the signal interconnect connected to the gate driving circuit. The detection interconnect SIG3 is formed in a region between the portion nearest to the peripheral side of the first substrate and the peripheral side of the first substrate SUB1 among the gate driving circuits and the signal interconnects.

As has been described above, in the display device of Embodiment 5, the detection interconnect SIG3 is formed in a region between the display area AR and the peripheral side of the first substrate SUB1 in a region in the upper portion in the drawing where the signal interconnect SIG4 is not formed, and the detection interconnect SIG3 is formed in a region between the signal interconnect SIG4 and the peripheral edge portion of the first substrate SUB1 in a region where the signal interconnect SIG4 is formed along the peripheral edge portion of the first substrate SUB1. Thus the inspector can easily inspect the substrate chipping in the first substrate SUB1 easily by visual observation, as well as substrate chipping can be detected by simple measurement such as resistance or pulse measurement between electrodes connected with the detection interconnect SIG3.

In the touch panel of the display devices of Embodiments 1 to 4, while description has been made of the example of applying the present invention to the capacitive type touch panel capable of detecting two or more detection positions, this not limitative but the invention is also applicable to touch panels of other systems such as a resistance type.

Further, in the touch panel in the display device of Embodiments 1 to 4, the electrode terminals connected with the detection interconnect SIG2 is formed also on the flexible printed substrate connected with the third substrate but this is not limitative and electrode terminal may also be formed only to the third substrate.

While inventions made by the inventor have been described specifically with reference to the embodiments of the invention, the inventions are not limited to the embodiments described above but can be modified variously within the range not departing the gist thereof.

What is claimed is:

1. A display device comprising:
   a coordinate input substrate having detection electrodes disposed in a detection region, and first interconnects outside the detection region;
   a protective plate on the coordinate input substrate;
   a light shielding material which has an opening and is disposed between the coordinate input substrate and the protective plate; and
   a first flexible substrate electrically connected to the coordinate input substrate,
   wherein the coordinate input substrate has a second interconnect, a first terminal, and a second terminal,
   wherein the second interconnect surrounds the detection region and the first interconnects,
   wherein the first terminal is formed at one end of the second interconnect,
   wherein the second terminal is formed at the other end of the second interconnect,
   wherein the second interconnect is disposed along a peripheral edge of at least three sides of the coordinate input substrate,
   wherein a display region is surrounded by the second interconnect,
   wherein the first terminal is in contact with a third terminal on the first flexible substrate, and the second terminal is in contact with a fourth terminal on the first flexible substrate,
   wherein the opening of the light shielding material is larger than the display region and surrounds the display region, and
   wherein the light shielding material overlaps the second interconnect along the peripheral edge of at least the three sides of the coordinate input substrate in plan view.

2. The display device according to claim 1, further comprising a display panel having the display region,
   wherein the coordinate input substrate is disposed between the display panel and the protective plate.

3. The display device according to claim 1, further comprising a first semiconductor chip,
   wherein a third interconnect and the first semiconductor chip are disposed on the first flexible substrate,
   wherein the third terminal is formed at one end of the third interconnect,
   wherein a fifth terminal is formed at the other end of the third interconnect, and
   wherein the first semiconductor chip does not overlap the third interconnect and the fifth terminal in plan view.

4. The display device according to claim 3, wherein the first semiconductor chip drives the coordinate input substrate.

5. The display device according to claim 3, wherein the third interconnect extends from the third terminal to the fifth terminal along an edge of the first flexible substrate and is disposed between the first semiconductor chip and the edge of the first flexible substrate.

6. The display device according to claim 3, wherein a fourth interconnect is disposed on the first flexible substrate,
wherein the fourth terminal is formed at one end of the fourth interconnect,
wherein a sixth terminal is formed at the other end of the fourth interconnect,
wherein the first semiconductor chip is disposed between the third interconnect and the fourth interconnect in plan view, and
wherein the first semiconductor chip does not overlap the fourth interconnect and the sixth terminal in plan view.

7. The display device according to claim 3, wherein the first flexile substrate supplies driving signals to the detection electrodes via the first interconnects and receives detection signals corresponding to a contact position from the detection electrodes.

8. The display device according to claim 2, wherein the display panel comprises:
a first substrate on which a plurality of video signal lines and a plurality of scanning signal lines intersecting the video signal lines are formed; and
a second flexible substrate electrically connected to the first substrate,
wherein a plurality of seventh terminals, a fifth interconnect, an eighth terminal and ninth terminal are formed on the first substrate,
wherein the seventh terminals receive video signals and scanning signals from an external system, the eighth terminal is formed at one end of the fifth interconnect, and the ninth terminal formed at the other end of the fifth interconnect,
wherein a plurality of tenth terminals, a eleventh terminal, twelfth terminal are formed on the second flexible substrate, and the plurality of tenth terminals are formed between the eleventh terminal and the twelfth terminal,
wherein the tenth terminals are connected to the seventh terminals, the eleventh terminal is connected to the eighth terminal, the twelfth terminal is connected to the ninth terminal, and
wherein the fifth interconnect is disposed along a peripheral edge of at least three sides of the first substrate.

9. The display device according to claim 8, wherein the display panel further comprises a second semiconductor chip receiving the video signals, supplying display signals to the video signal lines, and controlling the video signal lines and the scanning signal lines,
wherein the second semiconductor chip is formed on the first substrate and is surrounded by the fifth interconnect.

10. The display device according to claim 1, wherein the opening of the light shielding material is smaller than the detection region of the coordinate input substrate.

11. A coordinate input device comprising:
a coordinate input substrate having detection electrodes disposed in a detection region, and first interconnects outside the detection region;
a light shielding material which has an opening and is disposed on the coordinate input substrate; and
a first flexible substrate electrically connected to the coordinate input substrate,
wherein the coordinate input substrate has a second interconnect, a first electrode, and a second electrode,
wherein the second interconnect surrounds the detection region and the first interconnects,
wherein the first electrode is formed at one end of the second interconnect,
wherein the second electrode is formed at the other end of the second interconnect,
wherein the second interconnect is disposed along a peripheral edge of at least three sides of the coordinate input substrate,
wherein the first electrode is in contact with a third electrode on the first flexible substrate, or the second electrode is in contact with a fourth electrode on the first flexible substrate, and
wherein the light shielding material overlaps the second interconnect along the peripheral edge of at least the three sides of the coordinate input substrate in a plan view.

12. The coordinate input device according to claim 11, further comprising a first semiconductor chip,
wherein a third interconnect and the first semiconductor chip are disposed on the first flexible substrate,
wherein the third electrode is formed at one end of the third inter connect,
wherein a fifth electrode is formed at the other end of the third interconnect, and
wherein the first semiconductor chip does not overlap the third interconnect and the fifth electrode in a plan view.

13. The coordinate input device according to claim 12, wherein the first semiconductor chip drives the coordinate input substrate.

14. The coordinate input device according to claim 12, wherein the third interconnect extends from the third electrode to the fifth electrode along an edge of the first flexible substrate and is disposed between the first semiconductor chip and the edge of the first flexible substrate.

15. The coordinate input device according to claim 12, wherein a fourth interconnect is disposed on the first flexible substrate,
wherein the fourth electrode is formed at one end of the fourth interconnect,
wherein a sixth electrode is formed at the other end of the fourth interconnect,
wherein the first semiconductor chip is disposed between the third interconnect and the fourth interconnect in a plan view, and
wherein the first semiconductor chip does not overlap the sixth electrode and the fourth interconnect in a plan view.

16. The coordinate input device according to claim 11, wherein the opening of the light shielding material is smaller than the detection region of the coordinate input substrate.

17. The coordinate input device according to claim 16, wherein the first flexile substrate supplies driving signals to the detection electrodes via the first interconnects and receives detection signals corresponding to a contact position from the detection electrodes.

* * * * *